US005441238A

United States Patent [19]

Lindsley, III

[11] Patent Number: 5,441,238

[45] Date of Patent: Aug. 15, 1995

[54] APPARATUS FOR LIFTING ONE SIDE OF A SOFA FOR VACUUMING THEREBENEATH

[76] Inventor: Edward G. Lindsley, III, 121 Buscher Ave., Valley Stream, N.Y. 11580

[21] Appl. No.: 242,631

[22] Filed: May 13, 1994

[51] Int. Cl.$^6$ .............................................. F16H 29/02

[52] U.S. Cl. ................................ 254/95; 254/DIG. 6

[58] Field of Search .................................... 254/95–97, 254/DIG. 6, 4 R, 4 B, 4 C, 47; 74/500.5

[56] References Cited

U.S. PATENT DOCUMENTS

| | | | |
|---|---|---|---|
| 989,744 | 4/1911 | Wilmot | 254/97 |
| 1,008,694 | 11/1911 | Bryant | 254/95 |
| 3,964,729 | 6/1976 | Harlow | 254/131 |
| 4,976,413 | 12/1990 | Massey | 254/DIG. 6 |
| 5,141,204 | 8/1992 | Marosey | 254/8 R |

*Primary Examiner*—Robert C. Watson

[57] ABSTRACT

An apparatus for lifting an object for working therebeneath comprising a pair of parallel side plates having apertures through their upper ends and with a pin extending through the apertures. A base comprised of feet is secured with respect to the lower ends of the side plates. The base also has a forwardly extending foot. A sprocket is secured to the pin for rotation about an axis coincident with the axis of the pin with the sprocket having teeth extending radially therefrom. A chain is positioned over the sprocket with the links of the chain sequentially positionable with the teeth of the sprocket through the chain. A lifting plate is positionable in a lower orientation with a lifting surface. The lifting plate has an upwardly extending attachment member. A pedal has an interior end reciprocable between an elevated location and a lowered location. The pedal has an upwardly extending attachment member secured with respect to the second free end of the chain with a locking component.

3 Claims, 4 Drawing Sheets

APPARATUS FOR LIFTING ONE SIDE OF A SOFA FOR VACUUMING THEREBENEATH

BACKGROUND OF THE INVENTION

1. Field of the Invention

The present invention relates to a new and improved apparatus for lifting one side of a sofa for vacuuming therebeneath and, more particularly, pertains to lifting a portion of a sofa or other piece of furniture so that a vacuum sweeper may clean underneath the lifted portion.

2. Description of the Prior Art

The use of jacks or other mechanisms for lifting objects is known in the prior art. More specifically, jacks or other mechanisms for lifting objects heretofore devised and utilized for the purpose of lifting up objects for performing tasks underneath the lifted objects are known to consist basically of familiar, expected, and obvious structural configurations, notwithstanding the myriad of designs encompassed by the crowded prior art which has been developed for the fulfillment of countless objectives and requirements.

The prior art discloses a large number of jacks or other mechanisms for lifting objects. By way of example, U.S. Pat. No. Des. 3,467,405 to Fogg discloses a lever dolly.

U.S. Pat. No. 5,127,693 to Pruitt discloses a portable lifting device.

U.S. Pat. No. 5,135,200 to Neibrandt discloses a snowmobile jack.

U.S. Pat. No. 5,141,204 to Marosy discloses a rollable/foldable sofa jack.

Lastly, U.S. Pat. No. 5,181,694 to Collins discloses a floor covering installation tool.

In this respect, the apparatus for lifting one side of a sofa for vacuuming therebeneath according to the present invention substantially departs from the conventional concepts and designs of the prior art, and in doing so provides an apparatus primarily developed for the purpose of lifting a portion of a sofa or other piece of furniture so that a vacuum sweeper may clean underneath the lifted portion.

Therefore, it can be appreciated that there exists a continuing need for a new and improved apparatus for lifting one side of a sofa for vacuuming therebeneath which can be used for lifting a portion of a sofa or other piece of furniture so that a vacuum sweeper may clean underneath the lifted portion. In this regard, the present invention substantially fulfills this need.

SUMMARY OF THE INVENTION

In view of the foregoing disadvantages inherent in the known types of jacks or other mechanisms for lifting objects now present in the prior art, the present invention provides a new and improved apparatus for lifting one side of a sofa for vacuuming therebeneath. As such, the general purpose of the present invention, which will be described subsequently in greater detail, is to provide a new and improved apparatus for lifting one side of a sofa for vacuuming therebeneath and methods which have all the advantages of the prior art and none of the disadvantages.

To attain this, the present invention essentially comprises a new and improved apparatus for lifting one side of a sofa for vacumming therebeneath comprising, in combination, a pair of spaced vertically extending parallel side plates, the side plates having axially aligned apertures through their upper ends with a pin extending through the apertures to define the space between the side plates; a base comprised of two rectangularly shaped laterally extending feet secured with respect to the lower ends of the side plates and extending parallel with the axis of the pin, the base also having a forwardly extending foot perpendicular to the laterally extending feet, all the feet of the base having lower surfaces in common plane for positioning adjacent to the sofa to be lifted with the forwardly extending foot therebeneath; a sprocket secured to the pin for rotation about an axis coincident with the axis of the pin, the sprocket having teeth extending radially therefrom; a chain having a first free end and a second free end and an elongated central extent therebetween positioned over the sprocket with the links of the chain sequentially positionable with the teeth of the sprocket through the chain; a lifting plate positionable in a lower orientation immediately above the forwardly extending foot and having a horizontal forwardly extending lifting surface parallel with and above the upper surface of the forwardly extending foot, the lifting plate having an upwardly extending attachment member secured with respect to the first free end of the chain; a pedal having an interior end shiftably secured at a location between the side plates and an exterior end formed as a foot receiving pedal extending rearwardly of the side plates reciprocable between an elevated location and a lowered location, the pedal having an upwardly extending attachment member secured with respect to the second free end of the chain; and a locking component secured to the lower end of one of the side plates on the rearward face thereof, the locking component including a pivot plate and a pivot pin extending therethrough for allowing rotation of the pivot plate about an axis perpendicular to the axis of the pin and sprocket, the locking component having a notch movable to a locking orientation for receiving a portion of the pedal when depressed to secure the lifting plate in the raised orientation, the pivot plate being pivotable away from the pedal to allow the pedal to rise and the lifting plate to lower and return the sofa to its normal position on the floor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for lifting one side of a sofa for vacuuming therebeneath which has all the advantages of the prior art jacks or other mechanisms for lifting objects and none of the disadvantages.

It is another object of the present invention to provide a new and improved apparatus for lifting one side of a sofa for vacuuming therebeneath which may be easily and efficiently manufactured and marketed.

It is a further object of the present invention to provide a new and improved apparatus for lifting one side of a sofa for vacuuming therebeneath which is of a durable and reliable construction.

An even further object of the present invention is to provide a new and improved apparatus for lifting one side of a sofa for vacuuming therebeneath which is susceptible of a low cost of manufacture with regard to both materials and labor, and which accordingly is then susceptible of low prices of sale to the consuming public, thereby making such apparatus for lifting one side of a sofa for vacuuming therebeneath economically available to the buying public.

Still yet another object of the present invention is to provide a new and improved apparatus for lifting one side of a sofa for vacuuming therebeneath which provides in the apparatuses and methods of the prior art some of the advantages thereof, while simultaneously overcoming some of the disadvantages normally associated therewith.

Even still another object of the present invention is to lift a portion of a sofa or other piece of furniture so that a vacuum sweeper may clean underneath the lifted portion.

Lastly, it is an object of the present invention to provide an apparatus for lifting an object for working therebeneath comprising a pair of spaced vertically extending parallel side plates, the side plates having axially aligned apertures through their upper ends with a pin extending through the apertures to define the space between the side plates; a base comprised of laterally extending feet secured with respect to the lower ends of the side plates, the base also having a forwardly extending foot, all the feet of the base having lower surfaces in common plane for positioning adjacent to the object to be lifted with the forwardly extending foot therebeneath; a sprocket secured to the pin for rotation about an axis coincident with the axis of the pin, the sprocket having teeth extending radially therefrom; a chain having a first free end and a second free end and an elongated central extent therebetween positioned over the sprocket with the links of the chain sequentially positionable with the teeth of the sprocket through the chain; a lifting plate positionable in a lower orientation immediately above the forwardly extending foot and having a horizontal forwardly extending lifting surface parallel with and above the upper surface of the forwardly extending foot, the lifting plate having an upwardly extending attachment member secured with respect to the first free end of the chain; a pedal having an interior end shiftably secured at a location between the side plates and an exterior end formed as a foot receiving pedal extending rearwardly of the side plates reciprocable between an elevated location and a lowered location, the pedal having an upwardly extending attachment member secured with respect to the second free end of the chain; and a locking component to secure the pedal in a lowered orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
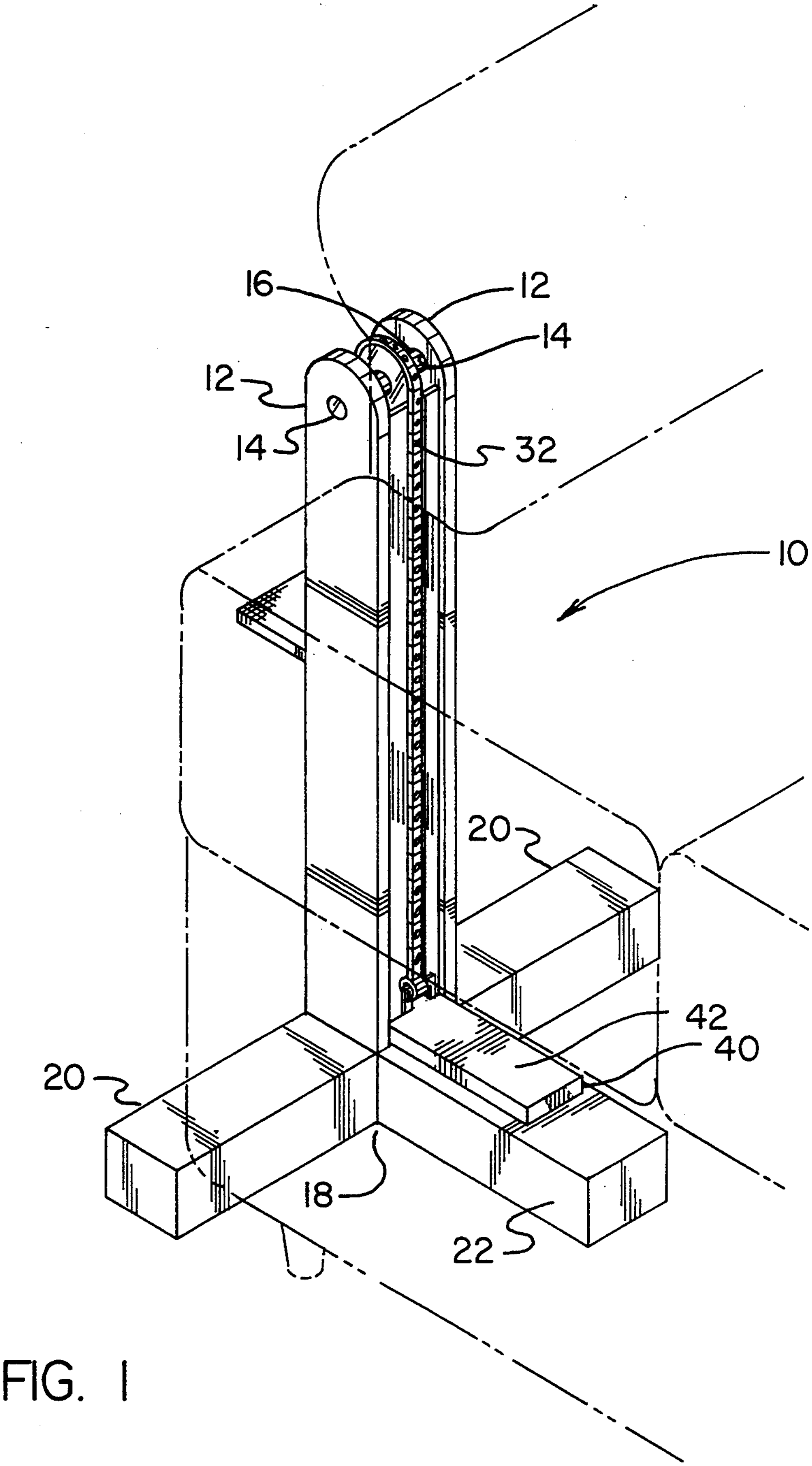
FIG. 1 is a perspective view of the preferred embodiment of the new and improved apparatus for lifting one side of a sofa for vacuuming therebeneath constructed in accordance with the principles of the present invention.
Figure 2:
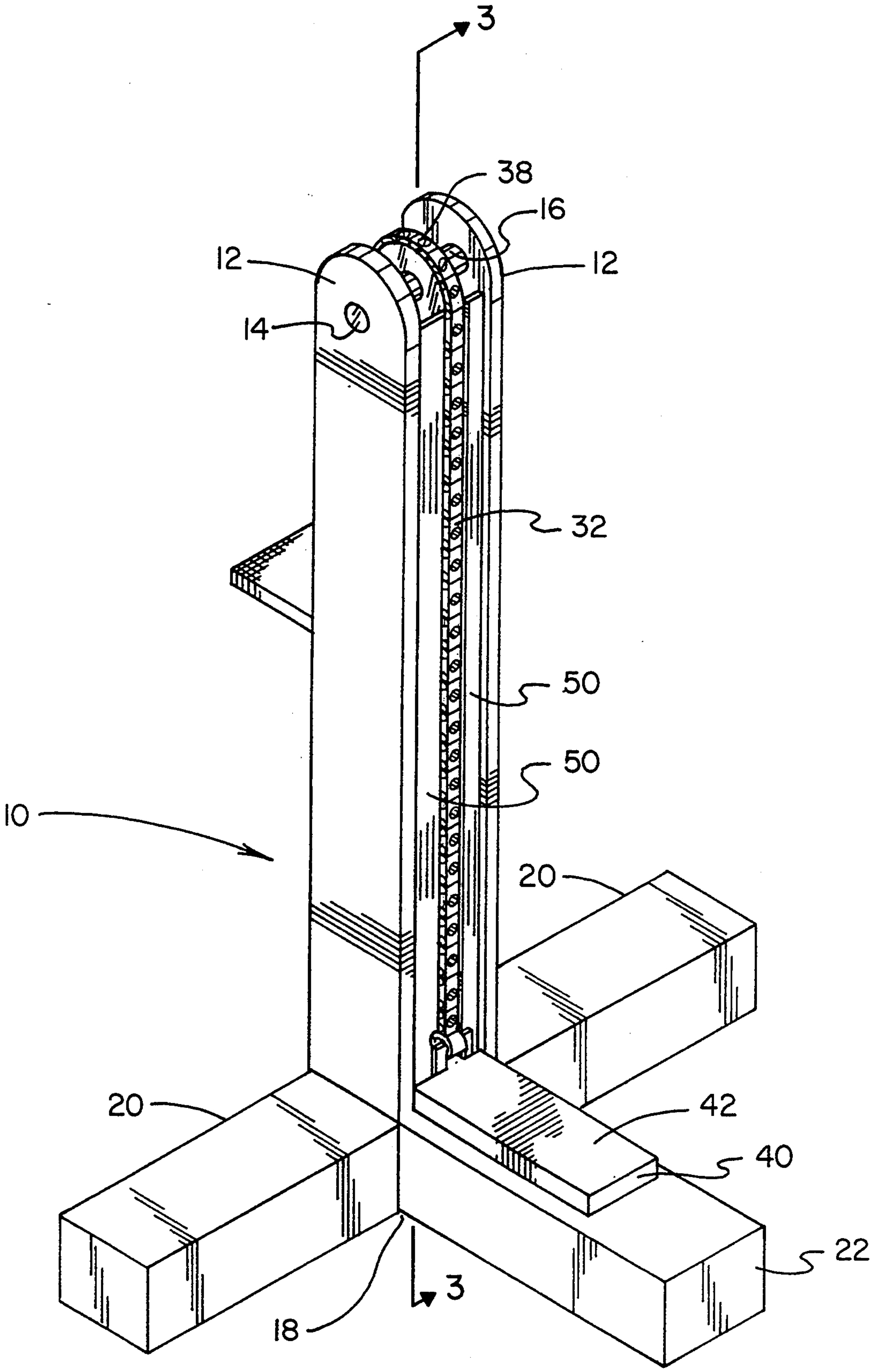
FIG. 2 is an enlarged perspective view of the device shown in FIG. 1 but without the sofa to be lifted.
Figure 3:
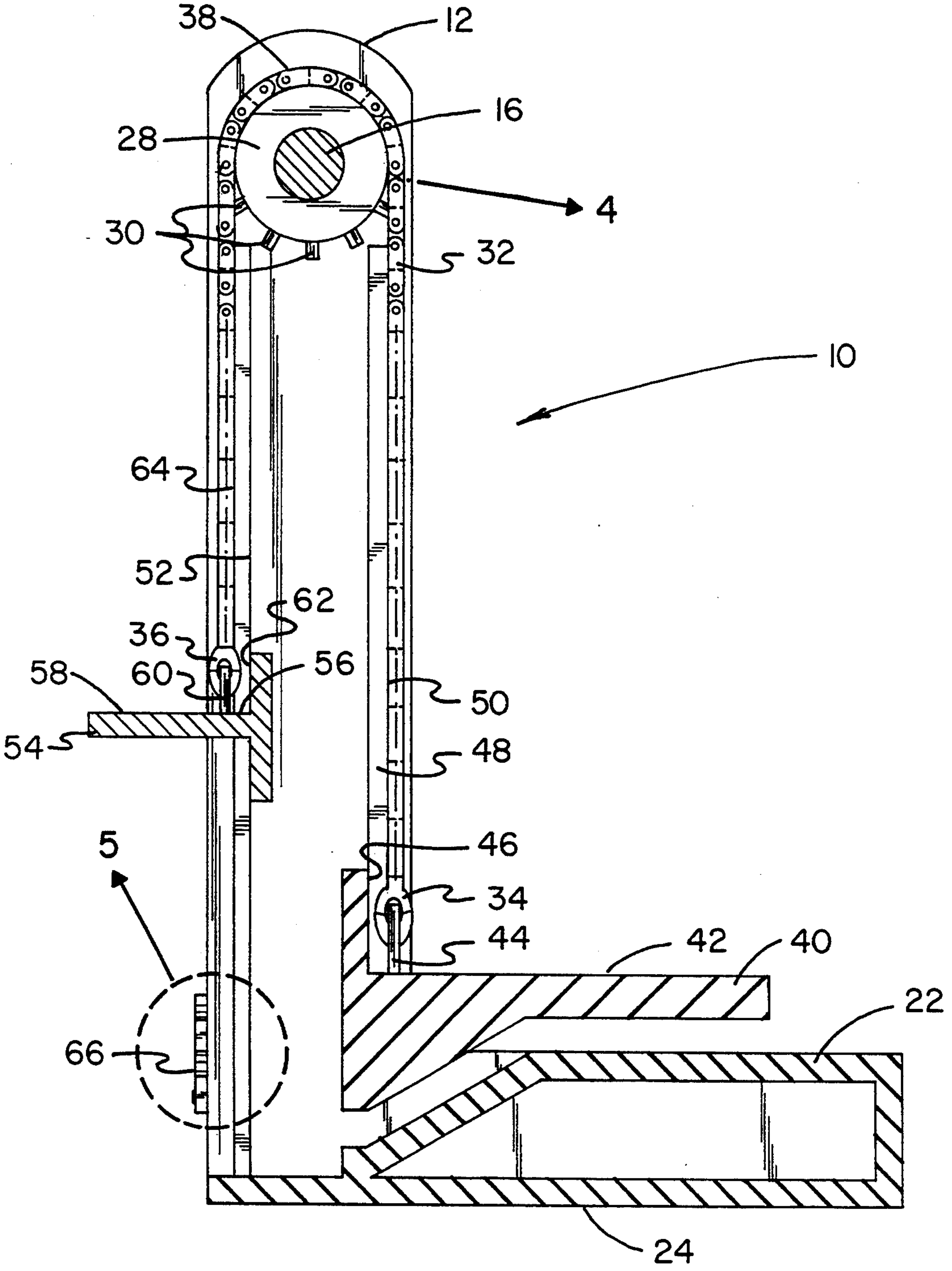
FIG. 3 is cross-sectional view of the device taken along line 3—3 of FIG. 2.
Figure 4:
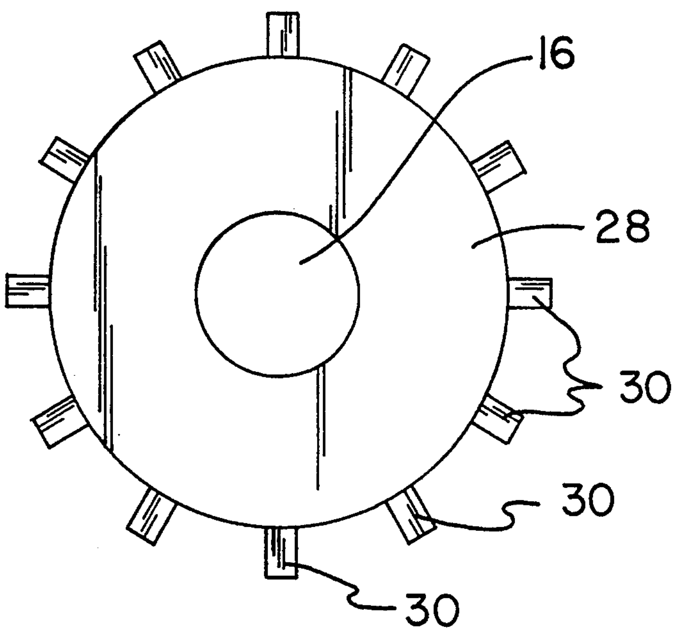
FIG. 4 is a front elevational view of the sprocket shown in FIG. 3.
Figure 5:
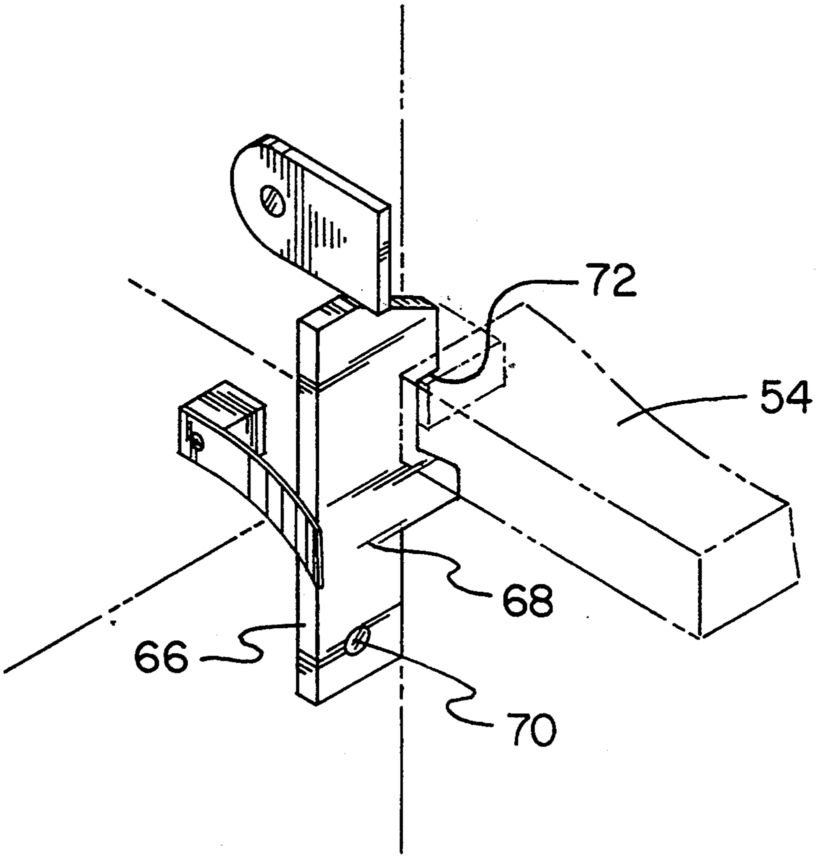
FIG. 5 is an enlarged section of the mechanism for locking the device in the elevated position taken about circle 5 of FIG. 3.

With reference now to the drawings, and in particular to FIGS. 1 through 5 thereof, the preferred embodiment of the new and improved apparatus for lifting one side of a sofa for vacuuming therebeneath embodying the principles and concepts of the present invention and generally designated by the reference numeral 10 will be described.

The present invention, the new and improved apparatus for lifting one side of a sofa for vacuuming therebeneath is a system 10 comprised of a plurality of components. Such components, in their broadest context, include side plates, a base, a sprocket, a chain, a lifting plate, a pedal and a locking component. Such components are individually configured and correlated one with respect to the other so as to attain the desired objective.

More specifically, the system 10 of the present invention includes a pair of similarly shaped vertically extending parallel side plates 12. The side plates have axially aligned apertures 14 extending through their upper ends. A pin 16 extends through the apertures to define a space between the side plates.

At the lower end of the side plates is a base 18. The base is comprised of two rectangularly shaped laterally extending feet 20. Such feet are secured with respect to the lower end of the side plates. They extend parallel with the axis of the pin. The base also has a forwardly extending foot 22 positioned perpendicularly with respect to the laterally extending feet. All of the feet of the base have lower surfaces 24 in a common horizontal plane positionable on the floor for positioning the sofa to be lifted with the forwardly extending foot therebeneath.

A sprocket 28 is secured to the pin. The sprocket is mounted for rotation about an axis coincident with the axis of the pin. The sprocket has teeth 30 extending radially therefrom.

Positioned over the sprocket and within the side plates is a chain 32. The chain has a first free end 34 and a second free end 36. Between the free ends is an elongated central extent 38. The central extent is positioned over the sprocket with the links of the chain sequentially positionable to have the teeth of the sprocket extend therethrough.

A lifting plate 40 is located forwardly of the side plates. It is positionable in a lower orientation immediately above the forwardly extending foot. The lifting plate has a horizontal forwardly extending lifting surface 42 parallel with the upper surface of the forwardly extending foot and immediately thereabove. The lifting plate has an upwardly extending attachment member 44 at its rearward end. Such attachment member is secured with respect to the first free end of the chain. Motion of the lifting plate to maintain its upper surface in a constant horizontal orientation is effected through laterally extending bearing surfaces 46 on its rearward end in contact with the rearward face of side plates 48 interior of the front face 50 of the side plates and interior of the chain.

Located adjacent to the rearward face 52 of the side plates is a pedal 54. The pedal has an interior end 56 shiftably secured at a location between the side plates. It has an exterior end formed as a foot receiving pedal 58 which extends rearwardly of the side plates. The pedal is reciprocable between an elevated location and a lowered location. The pedal has an upwardly extending attachment member 60 with respect to the second free end of the chain. Interiorly of the forward end of the pedal is a laterally extending bearing member 62. Such bearing member is adapted to ride in sliding contact with the forwardly extending face of side plates 64 forwardly of the chain to maintain the pedal in a horizontal orientation during its motion.

The last component of the system is a locking component 66. The locking component is secured to the lower end of one of the side plates on the rearward face thereof. The locking component includes a pivot plate 68 and a pivot pin 70 extending therethrough. This arrangement is for allowing rotation of the pivot plate about an axis perpendicular to the axis of the pin and sprocket. The locking component has a notch 72 and is movable to a locking orientation for receiving a side portion of the pedal when the pedal is depressed. Note FIG. 5. This orientation is to secure the lifting plate in a raised orientation. The pivot plate is pivotable away from the pedal to allow the pedal to rise and the lifting plate to lower. This is for returning the sofa to its normal position on the floor after vacuuming beneath the raised portion of the sofa.

The present invention is a foot operated jack used to elevate a sofa or couch sufficiently above the floor so the area underneath it can be cleaned and vacuumed more easily. Most similar pieces of furniture are extremely heavy and cannot be lifted by one person and held up while the area underneath is being cleaned. As a result, few people clean under the sofa very often because they must move the furniture around to do so.

The invention offers a relatively simple and inexpensive tool which can be used by the person who is doing the cleaning to elevate and hold a sofa or other piece of furniture up off the floor. It is a foot operated jack, consisting of a right angle pedestal that is set very close to the sofa. This allows a right angle lifting plate to fit under the bottom of the frame. The plate is attached to a chain or cable which passes over a sprocket or pulley at the top of the pedestal and extends down the back side and is then attached to a foot pedal. When the pedal is depressed, it raises the furniture a similar amount and locks into position when a latch is operated. It need only be elevated high enough to clear the timing equipment. The process is reversed to lower the couch. A press of the pedal is used to release the load sufficiently for the latch to be opened so the sofa can be slowly lowered back to rest on the floor again.

The present invention is fabricated from steel, utilizing metalworking presses to punch out and to form the shapes. This produces parts which are thin in section, light in weight but are very strong because of their design.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An apparatus for lifting one side of a sofa for vacuuming therebeneath comprising, in combination:

a pair of spaced vertically extending parallel side plates, the side plates having axially aligned apertures through their upper ends with a pin extending through the apertures to define the space between the side plates;

a base comprised of two rectangularly shaped laterally extending feet secured with respect to the lower ends of the side plates and extending parallel with the axis of the pin, the base also having a forwardly extending foot perpendicular to the laterally extending feet, all the feet of the base having lower surfaces in common plane for positioning adjacent to the sofa to be lifted with the forwardly extending foot therebeneath;

a sprocket secured to the pin for rotation about an axis coincident with the axis of the pin, the sprocket having teeth extending radially therefrom;

a chain having a first free end and a second free end and an elongated central extent therebetween positioned over the sprocket with the links of the chain sequentially positionable with the teeth of the sprocket through the chain;

a lifting plate positionable in a lower orientation immediately above the forwardly extending foot and having a horizontal forwardly extending lifting surface parallel with and above the upper surface of the forwardly extending foot, the lifting plate having an upwardly extending attachment member secured with respect to the first free end of the chain;

a pedal having an interior end shiftably secured at a location between the side plates and an exterior end formed as a foot receiving pedal extending rearwardly of the side plates reciprocable between an elevated location and a lowered location, the pedal having an upwardly extending attachment member secured with respect to the second free end of the chain; and a locking component secured to the lower end of one of the side plates on the rearward face thereof, the locking component including a pivot plate and a pivot pin extending therethrough for allowing rotation of the pivot plate about an axis perpendicular to the axis of the pin and sprocket, the locking component having a notch movable to a locking orientation for receiving a portion of the pedal when depressed to secure the lifting plate in the raised orientation, the pivot plate being pivotable away from the pedal to allow the pedal to rise and the lifting plate to lower and return the sofa to its normal position on the floor.

2. An apparatus for lifting an object for working therebeneath comprising:

a pair of spaced vertically extending parallel side plates, the side plates having axially aligned apertures through their upper ends with a pin extending through the apertures to define the space between the side plates;

a base comprised of laterally extending feet secured with respect to the lower ends of the side plates, the base also having a forwardly extending foot, all the feet of the base having lower surfaces in common plane for positioning adjacent to the object to be lifted with the forwardly extending foot therebeneath;

a sprocket secured to the pin for rotation about an axis coincident with the axis of the pin, the sprocket having teeth extending radially therefrom;

a chain having a first free end and a second free end and an elongated central extent therebetween positioned over the sprocket with the links of the chain sequentially positionable with the teeth of the sprocket through the chain;

a lifting plate positionable in a lower orientation immediately above the forwardly extending foot and having a horizontal forwardly extending lifting surface parallel with and above the upper surface of the forwardly extending foot, the lifting plate having an upwardly extending attachment member secured with respect to the first free end of the chain;

a pedal having an interior end shiftably secured at a location between the side plates and an exterior end formed as a foot receiving pedal extending rearwardly of the side plates reciprocable between an elevated location and a lowered location, the pedal having an upwardly extending attachment member secured with respect to the second free end of the chain; and a locking component to secure the pedal in a lowered orientation.

3. The apparatus as set forth in claim 2 wherein the locking component is secured to the lower end of one of the side plates on the rearward face thereof, the locking component including a pivot plate and a pivot pin extending therethrough for allowing rotation of the pivot plate about an axis perpendicular to the axis of the pin and sprocket, the locking component having a notch movable to a locking orientation for receiving a portion of the pedal when depressed to secure the lifting plate in the raised orientation, the pivot plate being pivotable away from the pedal to allow the pedal to rise and the lifting plate to lower and return the object to its normal position on the floor.

* * * * *